United States Patent [19]

Berger

[11] Patent Number: 5,148,899
[45] Date of Patent: Sep. 22, 1992

[54] METHOD AND APPARATUS FOR LOCKING OUT THE CLUTCH OF A MANUAL TRANSMISSION

[75] Inventor: Alvin H. Berger, Brownstown, Mich.

[73] Assignee: Ford Motor Company, Dearborn, Mich.

[21] Appl. No.: 796,281

[22] Filed: Nov. 22, 1991

[51] Int. Cl.⁵ .............................................. B60K 41/22
[52] U.S. Cl. .................... 192/3.63; 192/114 R
[58] Field of Search .................. 192/3.63, 114 R; 74/483 R

[56] References Cited

U.S. PATENT DOCUMENTS

| | | | |
|---|---|---|---|
| 2,115,097 | 4/1938 | Durham | 192/3.63 X |
| 2,479,083 | 8/1943 | Randol | |
| 3,011,357 | 12/1961 | Binder | |
| 3,092,229 | 6/1963 | Uher | 192/114 R X |
| 3,202,246 | 5/1963 | Findley et al. | |
| 3,265,170 | 11/1964 | Olnhausen | |
| 3,522,867 | 4/1968 | Page et al. | |
| 4,301,902 | 11/1981 | Gatsos et al. | |
| 4,549,637 | 10/1985 | Huckler et al. | 74/483 R X |
| 5,048,656 | 9/1991 | Braun | 192/114 R X |
| 5,052,245 | 10/1991 | Kigoshi | 74/483 R X |
| 5,056,632 | 10/1991 | Lemp et al. | 74/483 R X |

FOREIGN PATENT DOCUMENTS

| | | | |
|---|---|---|---|
| 3412577 | 10/1985 | Fed. Rep. of Germany | 192/3.63 |
| 2137303 | 10/1984 | United Kingdom | 192/3.63 |

*Primary Examiner*—Rodney H. Bonck
*Attorney, Agent, or Firm*—Roger L. May; Frank G. McKenzie

[57] ABSTRACT

A clutch lockout apparatus for locking out the clutch of a manual transmission is disclosed. The clutch lockout apparatus comprises a first electrical circuit for determining whether a gearbox is conditioned for torque delivery, and a clutch lockout having a projection which is movable from a normally retracted state when the gearbox is conditioned for torque delivery to an extended state when the gearbox is not conditioned for torque delivery. When the projection is in the extended state, movement of the clutch from a disengaged position to an engaged position is prevented. Also disclosed is a method for locking out the clutch of a manual transmission using this apparatus.

9 Claims, 3 Drawing Sheets

| | CLUTCH STATUS | CLUTCH LOCKOUT STATUS (PROJECTION) | SHIFTER LOCKOUT STATUS |
|---|---|---|---|
| CLUTCH PEDAL RELEASED TRANSMISSION IN NEUTRAL | DISENGAGED | EXTENDED | LOCKED |
| CLUTCH PEDAL DEPRESSED TRANSMISSION IN NEUTRAL | DISENGAGED | EXTENDED | UNLOCKED |
| CLUTCH PEDAL DEPRESSED TRANSMISSION IN GEAR | DISENGAGED | RETRACTED | UNLOCKED |
| CLUTCH PEDAL RELEASED TRANSMISSION IN GEAR | ENGAGED | RETRACTED | UNLOCKED |

FIG.7

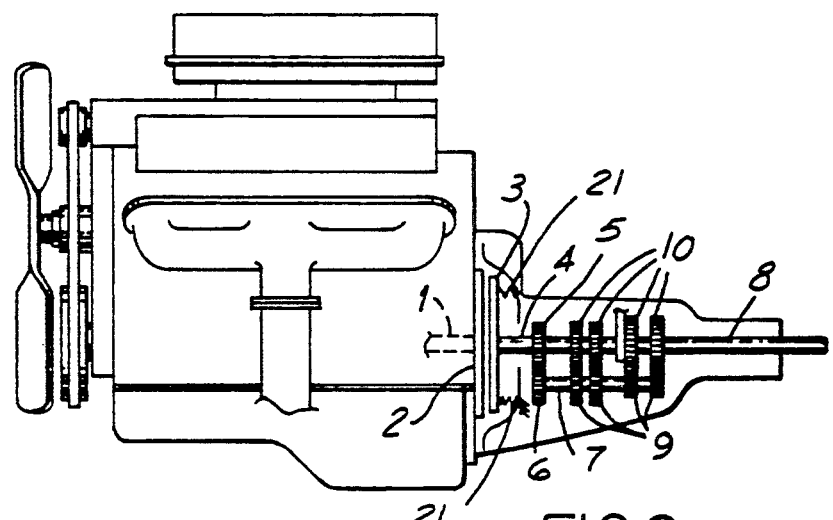

FIG.8

METHOD AND APPARATUS FOR LOCKING OUT THE CLUTCH OF A MANUAL TRANSMISSION

TECHNICAL FIELD

This invention relates to clutches for manual transmissions, and more particularly to clutch lockout devices for such transmissions.

BACKGROUND ART

A conventional manual transmission for a motor vehicle includes a clutch and a gearbox. The clutch functions to temporarily disengage delivery of torque from an engine crankshaft to the gearbox, in order that the gears may be shifted. Typically, the gearbox comprises an output shaft connected to the drive wheels of the vehicle, a layshaft or countershaft, and a clutchshaft or input shaft which is rotated by the engine whenever the clutch is engaged. Both the clutchshaft and the output shaft are provided with gears in constant mesh with mating gears on the countershaft, and the output shaft turns at some ratio of the engine crankshaft depending on which gears are established as the driving connection between the countershaft and the output shaft.

The noise created by the rotation of unloaded meshing gears, known as idle rollover, is a problem with conventional manual transmissions. Regardless of the state of the clutch or the position of the gear selector, the gears on the countershaft remain in mesh with the gears on the clutchshaft and output shaft at all times. Whenever the gear selector is in a neutral position and the clutch is engaged, noise results because these gears are rotated by the engine crankshaft. This noise is compounded by engine idle speed changes which occur continually without any action by the operator.

Various prior art patents teach designs in which the transmission may not be put into gear while the clutch is engaged. For instance, U.S. Pat. No. 3,265,170 discloses a vehicle clutch-to-transmission shifting assembly interlock wherein the transmission cannot be shifted until the clutch pedal is depressed. Similarly, U.S. Pat. No. 3,522,867 discloses a fluid pressure operated clutch and gears with interlock in which the transmission cannot be put into gear or taken out of gear before the clutch is disengaged. Other designs teach devices for holding the clutch disengaged when shifting gears. U.S. Pat. No. 3,011,357 teaches a clutch-controlled automatic gear shifting mechanism which is hydraulically operated and in which reengagement of the clutch is not possible until after the gear shifting operation has been completed.

SUMMARY OF THE INVENTION

The clutch lockout apparatus of the present invention is adapted for use with a manual transmission having a pedal-operated clutch which is movable between engaged and disengaged positions when the clutch pedal is released and depressed, respectively. Rotary motion of the engine crankshaft is transmitted to the transmission gearing when the clutch pedal is released, but the driving connection between the crankshaft and the gearing is interrupted when the clutch pedal is depressed.

The lockout apparatus includes means for determining whether the gearbox is conditioned for torque delivery, and a clutch lockout having a projection that is moveable from a normally retracted state when the gearbox is conditioned for torque delivery to an extended state when the gearbox is not conditioned for torque delivery. When the projection is in its extended state, it projects between the position assumed by the disengaged clutch and the position assumed by the engaged clutch. This prevents movement of the clutch from the disengaged position to the engaged position.

An object of the present invention is therefore to provide an improved clutch lockout apparatus which eliminates idle rollover noise.

Another object of the present invention is to provide a clutch lockout apparatus of the type described above in which the clutch is held disengaged whenever the gearbox is not conditioned for torque delivery and the clutch pedal is released.

A further object of the invention is to provide a clutch lockout apparatus of the type described above having a shifter rail lockout to prevent engagement of the transmission while the clutch lockout projection is extended and the clutch is locked out.

Still another object of the invention is to provide a method of eliminating idle rollover noise by holding the clutch disengaged whenever the gearbox is not conditioned for torque delivery and the clutch pedal is released.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 7 is a table showing a strategy for operating the apparatus to lock out the clutch of a manual transmission; and FIG. 8 is a partial cross-sectional view of a conventional clutch and gearbox.

BEST MODE FOR CARRYING OUT THE INVENTION

Figure 1:
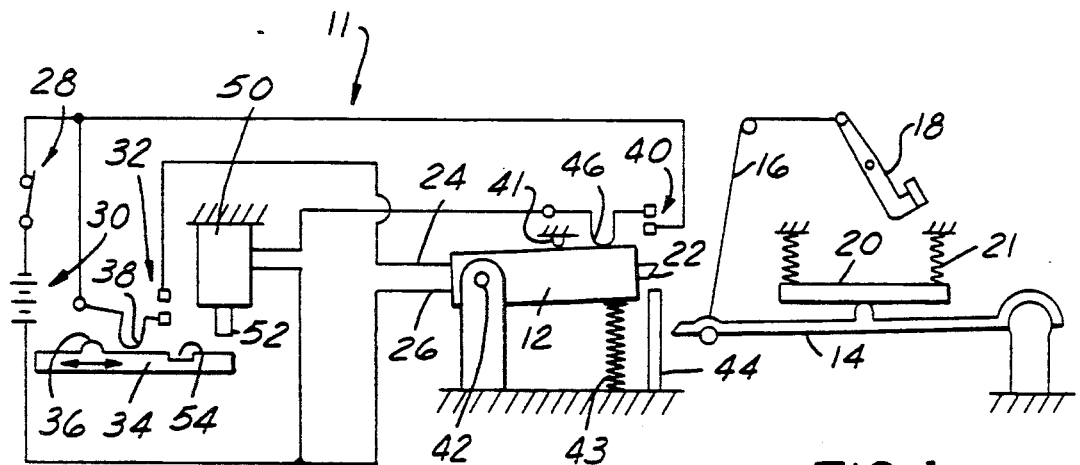
FIG. 1 is a schematic view of an electromechanical apparatus according to the present invention for locking out a manual transmission clutch.

With reference to the drawings, the preferred embodiments of the present invention will be described.

FIG. 8 shows a conventional motor vehicle clutch and gearbox arrangement. An engine crankshaft 1 and a flywheel 2 are rotated by the engine. A clutchplate 3 is moveable between a disengaged position where it is separated from the flywheel 2, and an engaged position where it is in contact with the flywheel 2. When engaged, rotary motion or torque is transmitted from the flywheel 2 to the clutchplate 3, which in turn rotates a clutchshaft 4 and a gear 5 at the end of the clutchshaft. Rotation of the gear 5 is transmitted to a gear 6, and rotary motion is thereby transmitted to a layshaft or countershaft 7. An output shaft 8 is then rotated according to which of several gears 9 on the countershaft 7 drive one of several gears 10 on the output shaft 8. Typically, the gears 9 are constantly in mesh with the gears 10 regardless of which pair of gears forms the driving connection.

FIG. 1 schematically shows a clutch lockout device 11 for locking out a clutch such as the one described above. The apparatus comprises a clutch lockout solenoid 12 which operates in conjunction with a clutch release arm 14. The clutch release arm 14 is operatively connected by means of a cable 16 to a clutch pedal 18. When the clutch pedal 18 is released as shown in FIG. 1, the clutch release arm 14 and a throwout bearing 20 are biased by clutch engagement springs 21 to a position in which the clutch is engaged. In the engaged position, rotation of the engine crankshaft is transmitted to the gearbox of the transmission.

The clutch lockout solenoid 12 has a plunger or projection 22 which is normally in a retracted state. Two leads 24 and 26 from the clutch lockout solenoid 12 form part of a first electrical circuit including an ignition switch 28, a power source 30, and a neutral switch 32. The neutral switch 32 is open, and the clutch solenoid 12 not energized, whenever a shifter rail 34 is in a position corresponding to a forward or reverse gear.

The shifter rail 34 is moveable with a gear selector (not shown) between a plurality of positions to put the transmission in forward, reverse, or neutral gears. When the gear selector moves the shifter rail 34, the desired gear is locked to the output shaft. Because all the gears on the output shaft are rotated by constantly meshing gears on the countershaft, the desired gear and the output shaft must be brought to the same rotational speed before they can be locked together. A synchronizer is typically used for this application. While the shifter rail 34 is then in a position corresponding to a forward or reverse gear, the gearbox of the transmission is conditioned for torque delivery from the engine to the transmission output shaft to propel the vehicle.

Figure 2:
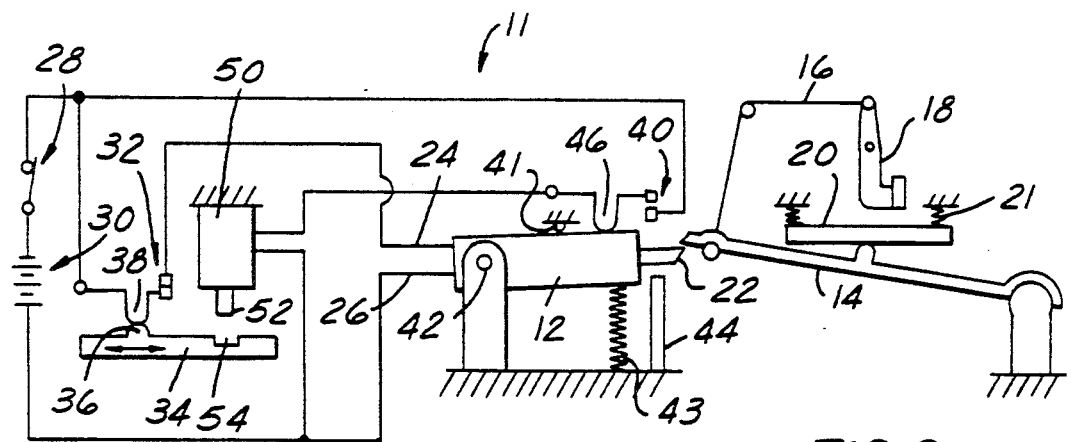
FIG. 2 is a schematic view similar to FIG. 1 showing the apparatus with the transmission in neutral and the clutch pedal depressed.

FIG. 2 schematically shows the clutch disengaged position. When the clutch pedal 18 is depressed, it draws the clutch release arm 14 by means of the cable 16, and displaces the throwout bearing 20. In this position, engine crankshaft rotation is not transmitted to the gearbox of the transmission. If the shifter rail 34 is then moved to a position corresponding to the idle or neutral gear while the clutch is disengaged, a nub 36 on the shifter rail 34 moves a similar nub or follower 38 to close the contacts 32 of the first electrical path. With this circuit closed, the clutch lockout solenoid 12 is energized, and the clutch lockout projection 22 moves to its extended state. Because the clutch pedal 18 has been depressed, drawing the cable 16 and the clutch release arm 14 to the clutch disengaged position, the clutch lockout solenoid projection 22 projects between the clutch release arm 14 and the position the clutch release arm 14 assumed in the clutch engaged position shown in FIG. 1. Solenoid 12 and projection 22 are biased in a counterclockwise direction against stop 41 by spring 43. At this point, with the clutch pedal 18 still depressed, a second set of contacts 40 forming a clutch lockout sensor switch remain open.

Figure 3:
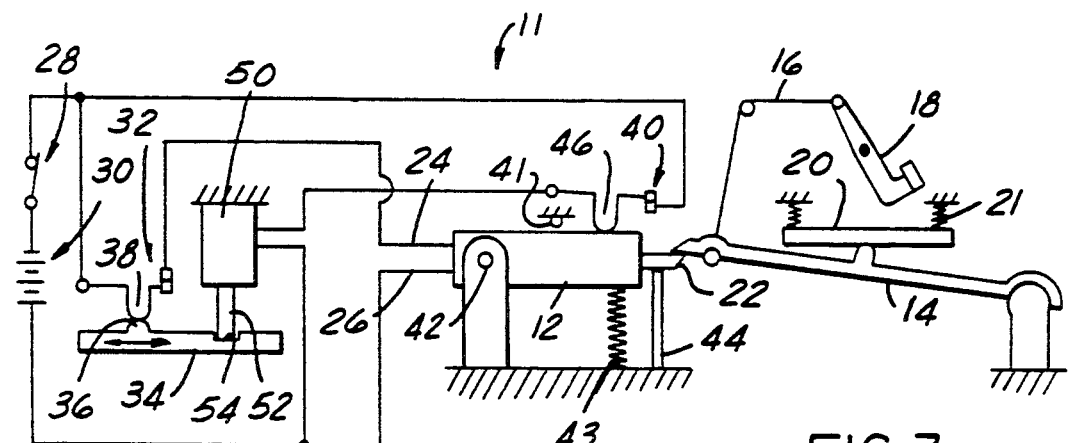
FIG. 3 is a schematic view similar to FIGS. 1 and 2 showing the apparatus with the transmission in neutral and the clutch pedal released.

FIG. 3 schematically shows the clutch lockout apparatus 11 with the clutch lockout solenoid projection 22 in its extended state and the clutch pedal 18 released. With the clutch pedal 18 released, the clutch release arm 14 and the throwout bearing 20 are biased toward the clutch engaged position by the clutch engagement springs 21. This forces the clutch lockout solenoid 12 to pivot clockwise about a mounting pin 42 from its first position shown in FIGS. 1 and 2 to a second position shown in FIG. 3. In the second position, spring 43 is compressed until the clutch lockout solenoid projection 22 comes to rest on a support 44. Alternatively, the solenoid 12 could itself come to rest on a support. In this way, the clutch is locked out and idle rollover noise is prevented because rotation of the engine crankshaft is not transmitted to the gear set. Preferably, both the clutch release arm 14 and the clutch lockout solenoid projection 22 have angled or beveled tips to allow the clutch release arm 14 to move to the disengaged position if the clutch pedal 18 is depressed when the projection 22 is extended.

With the clutch solenoid 12 biased against the support 44, a nub 46 falls and closes the clutch lockout sensor switch 40. This completes a second electrical circuit which includes the ignition switch 28, the power supply 30, and a shifter lockout solenoid 50. This in turn energizes the shifter lockout solenoid 50 and moves a shifter lockout projection 52 into a groove 54 on the shifter rail 34. It should be apparent to one skilled in the art that some other means of signaling that the clutch is locked out and the clutch pedal is released could be provided. When the shifter rail lockout projection 52 is so extended, the shifter rail 34 is prevented from moving from the position wherein the gearbox is not conditioned for torque delivery. The shifter rail lockout 50 thus prevents selection of a forward or reverse gear while the clutch is held in the disengaged position by the lockout solenoid 12.

Figure 4:
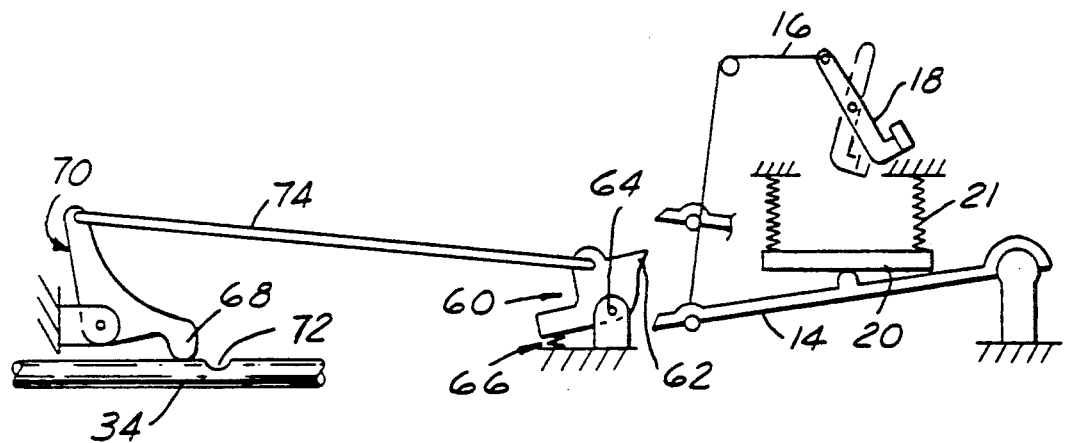
FIG. 4 is a schematic view of an alternative mechanical embodiment of an apparatus according to the present invention for locking out the manual transmission clutch.
Figure 5:
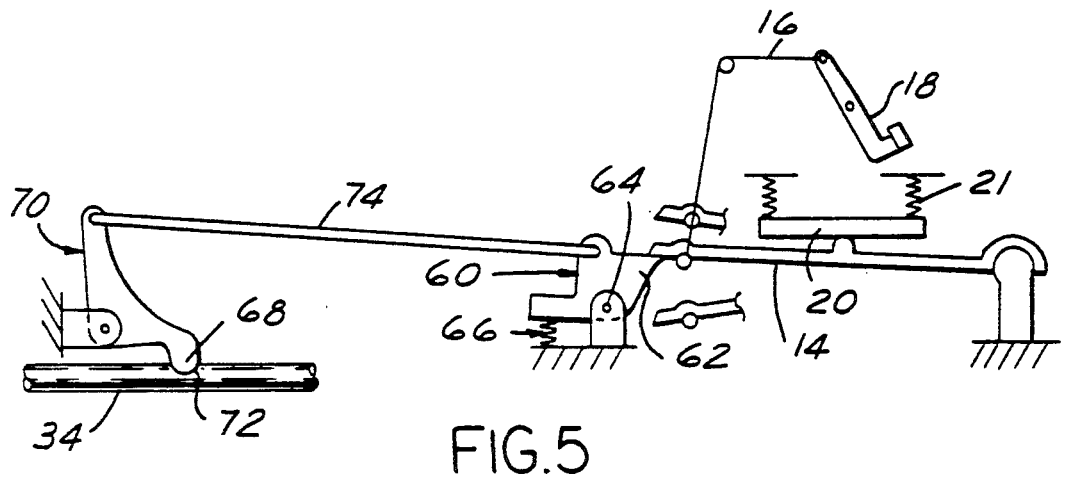
FIG. 5 is a schematic view of the alternative embodiment shown in FIG. 4 showing the apparatus with the transmission in neutral.

FIGS. 4 and 5 show an alternative embodiment of the clutch lockout apparatus of the present invention. As shown in FIG. 4, a clutch lockout 60 having a projection 62 is pivotably mounted about a mounting pin 64. A light spring 66 biases the projection 62 into the travel path of the clutch release arm 14. The projection 62 is held retracted, however, whenever a first end 68 of a pivotable member 70 is not engaged with a notch 72 on the shifter rail 34. This corresponds to the vehicle being in gear.

Figure 6:
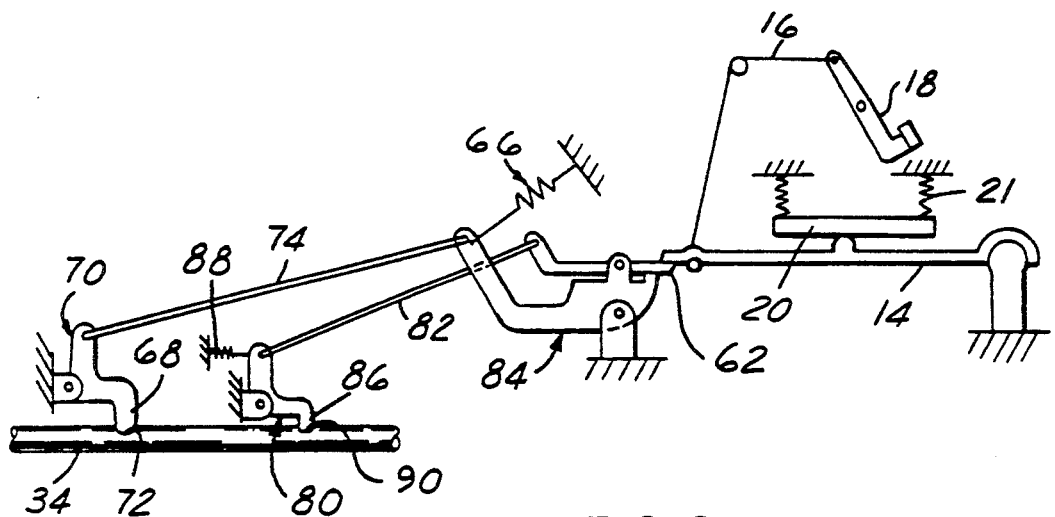
FIG. 6 is a schematic view of another alternative embodiment of the present invention including a mechanical shifter rail lockout mechanism.

FIG. 5 shows the alternative embodiment shown in FIG. 4 with the transmission in neutral. The first end 68 of the pivotable member 70 is biased into the notch 72 by the force of the spring 66 as transmitted through a tensile member 74. The tensile member 74 may be a rod, wire, or cable, and is connected between the pivotable member 70 and the clutch lockout 60. When the first end 68 of the pivotable member 70 is engaged with the notch 72, the clutch lockout rotates about the mounting pin 64 such that the projection 62 extends into the travel path of the clutch release arm 14. Assuming the clutch pedal 18 has been depressed while the transmission was placed in neutral, the clutch is thus prevented from moving to the engaged position because the clutch release arm 14 and the throwout bearing 20 are locked out. The force of the clutch release arm 14 upon the projection 62 adds to the light spring force holding the first end 68 of the pivotable member 70 in the notch 72 and preventing movement of the shifter rail 34. When the vehicle operator thereafter wishes to engage a gear, the clutch pedal 18 is depressed, drawing the clutch release arm 14 off the clutch lockout projection 62. Thereafter, the notch 72 on the shifter rail 34 is easily disengaged from the first end 68 of the pivotable member 70. One skilled in the art will appreciate that the pivotable member 70, the tensile member 74, and the clutch lockout 60 can be integrated into a single piece if physical constraints permit FIG. 6 shows another alternative embodiment of the clutch lockout apparatus of the present invention including a shifter rail lockout mechanism. The shifter rail lockout mechanism comprises a pivotably mounted shifter rail lockout 80, and a second tensile member 82 connected between the shifter rail lockout 80 and a modified clutch lockout 84. In this embodiment, a projection 86 on the shifter rail lockout 80 is held in a normally retracted position by a spring 88. When the transmission is placed in neutral and the first end 68 of the pivotable member 70 engages the notch 72, the clutch lockout 84 pivots to lock out the clutch release arm 14 as described. When the clutch pedal 18 is released, the force of the clutch release arm 14 against the projection 62 is transferred through the tensile member 82, rotating the shifter rail lockout 80 and extending the projection 86 into a detent 90 on the shifter rail 34. The shifter rail 34 is thus locked out. To unlock the shifter rail 34, the clutch pedal 18 must be depressed to remove the load of the clutch release arm 14 from the projection 62, allowing the light spring 88 to pivot the shifter rail lockout 80 and retract the projection 86 from the detent 90.

While the embodiments described above operate electrically and mechanically, it should be understood that the clutch lockout projection and the shifter rail lockout projection could be pneumatically or hydraulically operated. For instance, air, water, oil, or vacuum lines could be substituted for the electrical paths, or spiraled cables with a return spring could be used to extend and retract the projections.

FIG. 7 shows a strategy for locking out the clutch. The four combinations of clutch pedal and transmission positions are given down the left-hand side of the table. The three columns indicate the status, respectively, of the clutch, clutch lockout projection, and shifter lockout.

As indicated in the bottom row, the normal operating condition of the motor vehicle is with the clutch pedal released and the transmission in gear. In this condition, the clutch is engaged, the clutch lockout projection is retracted, and the shifter lockout is unlocked. Continuing with the third row of the table, when the clutch pedal is depressed, the clutch is disengaged, the clutch lockout projection is retracted, and the shifter lockout remains unlocked. According to the present invention, when the transmission is next shifted into neutral, the clutch lockout projection is extended, while the clutch remains disengaged and the shifter lockout remains unlocked. Finally, if the clutch pedal is thereafter released while the transmission is in neutral, as shown in the first row of FIG. 7, the shifter lockout is locked to prevent the transmission from being put into gear while the clutch lockout projection is extended to hold the clutch disengaged.

From the above description, a method of eliminating neutral rollover noise in a manual transmission is apparent. The method comprises determining when the gearbox is not conditioned for torque delivery, and then moving the clutch lockout projection from a normally retracted state to an extended state to prevent movement of the clutch from the disengaged position to the engaged position when the condition is met. The method may further comprise locking out the shifter rail to prevent engagement of a drive gear while the clutch is locked out.

It should be understood that while the forms of the invention herein shown and described constitute preferred embodiments of the invention, they are not intended to illustrate all possible forms thereof. It also should be understood that the words used are words of description rather than limitation, and various changes may be made without departing from the spirit and scope of the invention disclosed.

I claim:

1. In combination with a manual transmission having a shifter rail, a gearbox, and a clutch, the shifter rail being movable between a plurality of positions wherein the gearbox is conditioned for torque delivery and a position wherein the gearbox is not conditioned for torque delivery, the clutch being movable between an engaged position wherein rotation of an engine crankshaft is transmitted to the gearbox and a disengaged position wherein rotation of the engine crankshaft is not transmitted to the gearbox, an apparatus for locking out the clutch, the apparatus comprising:

means for determining whether the gearbox is conditioned for torque delivery; and a clutch lockout solenoid having a projection which is movable from a normally retracted state when the gearbox is conditioned for torque delivery to an extended state when the gearbox is not conditioned for torque delivery, the projection moving to its extended state upon the clutch lockout solenoid being energized, the projection in its extended state projecting between the disengaged position of the clutch and the engaged position of the clutch to prevent movement of the clutch from the disengaged position to the engaged position.

2. The apparatus of claim 1 wherein the means for determining whether the gearbox is conditioned for torque delivery comprises first electrical circuit means for energizing the clutch lockout solenoid when the shifter rail is moved to the position wherein the gearbox is not conditioned for torque delivery.

3. The apparatus of claim 2 further comprising means for determining whether the clutch lockout solenoid projection is in its extended state and the clutch is prevented from moving to the engaged position.

4. The apparatus of claim 3 further comprising a shifter rail lockout having a projection which is moveable from a normally retracted state to an extended state when the clutch lockout solenoid projection is in its extended state and the clutch is prevented from moving to the engaged position, the shifter rail lockout projection in its extended state preventing movement of the shifter rail from the position wherein the gearbox is not conditioned for torque delivery.

5. The apparatus of claim 4 wherein the shifter rail lockout comprises a solenoid which moves the shifter rail lockout projection to its extended state upon being energized.

6. The apparatus of claim 5 further comprising a clutch engagement spring for biasing the clutch to the engaged position, a clutch release arm operatively connected to the clutch, and a clutch pedal operatively connected to the clutch release arm such that the clutch release arm moves the clutch against the bias of the clutch engagement spring and to the disengaged position when the clutch pedal is depressed.

7. The apparatus of claim 6 wherein the means for determining whether the clutch lockout solenoid projection is in its extended state and the clutch is prevented from moving to the engaged position comprises second electrical circuit means for energizing the shifter rail lockout solenoid when the clutch lockout solenoid is biased from a first position to a second position by the clutch engagement spring biasing the clutch toward the engaged position.

8. A method of eliminating idle rollover noise in a manual transmission, the manual transmission having a shifter rail, a gearbox, and a clutch, the shifter rail being movable between a plurality of positions wherein the gearbox is conditioned for torque delivery and a position wherein the transmission is not conditioned for torque delivery, the clutch being movable between an engaged position wherein rotation of an engine crankshaft is transmitted to the gearbox and a disengaged position wherein rotation of the engine crankshaft is not transmitted to the gearbox, the method comprising:
  determining whether the gearbox is conditioned for torque delivery; and
  energizing a clutch lockout solenoid to move a projection from a normally retracted state to an extended state when the gearbox is not conditioned for torque delivery to prevent movement of the clutch from the disengaged position.

9. The method of claim 8 further comprising preventing movement of the shifter rail from the position wherein the gearbox is not conditioned for torque delivery while the clutch lockout projection is in its extended state preventing the clutch from moving from the disengaged position.

* * * * *